United States Patent [19]

Heine et al.

[11] Patent Number: 5,756,025
[45] Date of Patent: May 26, 1998

[54] METHOD FOR INJECTION MOLDING A SEAL CARRIER TO A SEALING MEMBER

[75] Inventors: Steffen Heine, Stadt Wehlen; Michael Kinzel, Badendorf; Heiko Schumacher, Bad Oldesloe, all of Germany

[73] Assignee: Dichtungstechnik G. Bruss GmbH & Co.KG, Hoisdorf/Hamburg, Germany

[21] Appl. No.: 559,950

[22] Filed: Nov. 17, 1995

[30] Foreign Application Priority Data

Nov. 25, 1994 [DE] Germany ............ 44 42 080.3

[51] Int. Cl.$^6$ .................. B29C 45/14; B29C 69/02
[52] U.S. Cl. .................. 264/135; 264/265; 264/274; 264/483
[58] Field of Search .................. 264/250, 251, 264/252, 254, 255, 259, 266, 275, 271.1, 274, 135, 446, 483, 494, 496; 427/488, 497

[56] References Cited

U.S. PATENT DOCUMENTS

| 3,786,126 | 1/1974 | Reimschussel et al. | 264/255 |
| 4,135,297 | 1/1979 | Guttenberger et al. | 264/274 |
| 4,468,367 | 8/1984 | Buene et al. | 264/255 |
| 4,567,633 | 2/1986 | Corkery | 264/274 |
| 4,850,097 | 7/1989 | Graf et al. | 264/250 |
| 4,915,892 | 4/1990 | Peppiatt | 264/250 |
| 5,198,053 | 3/1993 | Duncan | 156/64 |
| 5,470,516 | 11/1995 | Fudaki | 264/252 |

FOREIGN PATENT DOCUMENTS

| 3246152 | 1/1985 | Germany . |
| 3619309 | 9/1987 | Germany . |
| 3710403 | 10/1988 | Germany . |
| 9306394 | 4/1993 | WIPO . |

Primary Examiner—Angela Y. Ortiz
Attorney, Agent, or Firm—Jon E. Shackelford

[57] ABSTRACT

A seal for movable structural components, like piston rods or shafts, includes a carrier body made of thermoplastic material and a sealing member locked to said carrier body and made of polytetrafluoroethylene (PTFE) material. A form-lock connection is achieved by an undercut which is formed permanently in the sealing member and filled with plastic material of the carrier body.

6 Claims, 4 Drawing Sheets

METHOD FOR INJECTION MOLDING A SEAL CARRIER TO A SEALING MEMBER

BACKGROUND OF THE INVENTION

1. Field of the Invention

The present invention relates to a seal for movable structural components such as piston nods on shafts.

2. Description of Prior Developments

A seal having a carrier body of plastic material and a polytetrafluoroethylene (PTFE) sealing member is known from DE 35 42 211 C2. In that case, cuts are formed in the sealing member before placing it in the injection mold for the formation of the carrier body. Those cuts are closed in the undeformed state of the sealing member and are opened when the sealing member is deformed as it is introduced into the injection mold. The injected plastic material is intended to make its way into those cuts so as to provide a connection in form lock between the carrier body and the PTFE sealing member. For that to be possible, the sealing member would have to be securely fixed in a deformed condition in the injection mold. However, that is not disclosed and, besides, it would be very expensive. Moreover, it would a problem in the mass production of the known seal to assure the reproducible centering of the sealing member with respect to the structural component to be sealed.

In another known seal (DE-OS 24 60 185) the sealing member is clamped in force lock between two metal parts, with the interposition of a rubber sealing disc.

EP 0 615 085 discloses an integrated shaft sealing ring which comprises a carrier body in the form of light die cast metal and a sealing member made of PTFE and vulcanized to the same through an elastomer.

SUMMARY OF THE INVENTION

It is an object of the invention to provide a seal, comprising a carrier body and a PTFE sealing member, which permits a direct, durable connection between the carrier body and the sealing member to be made in a simple way and in a reproducible manner which is suitable for large scale production. The object is met, in accordance with the invention.

In the case of one further development which is especially advantageous the sealing member is modified, prior to its placement in the injection mold, at least in that part of its surface area which is to be connected to the carrier body by incorporation of a plastic component which is identical or compatible with the plastic material of the carrier body. In this manner a substance-lock connection can be obtained during the injection molding between the PTFE sealing member and the carrier body, in addition to the form-lock connection. And that additional connection is characterized by an especially good static tightness.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
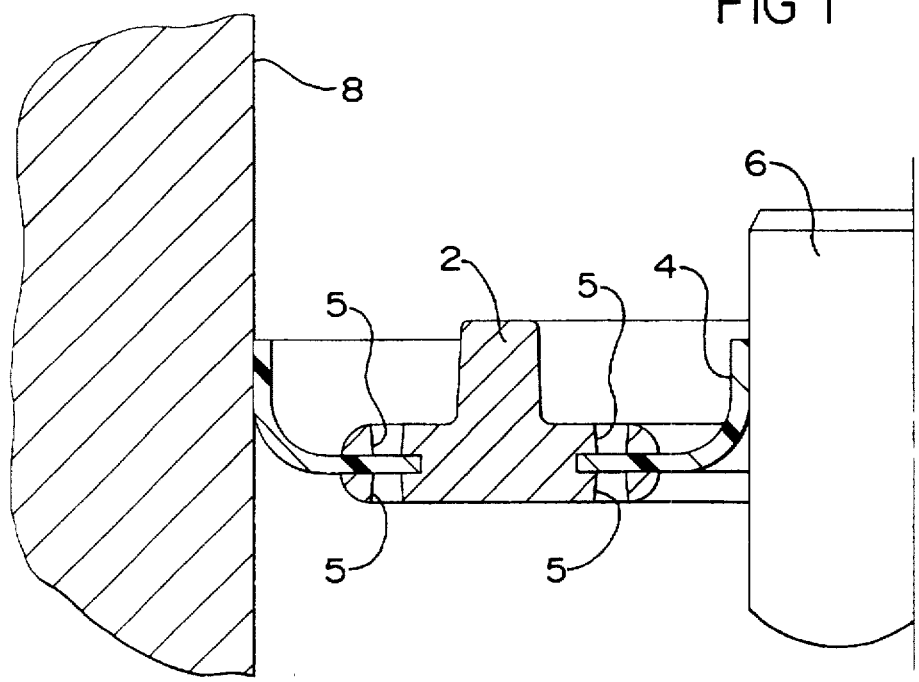
FIG. 1 is an axial semisection of a seal for a piston rod of a piston.
Figure 10:
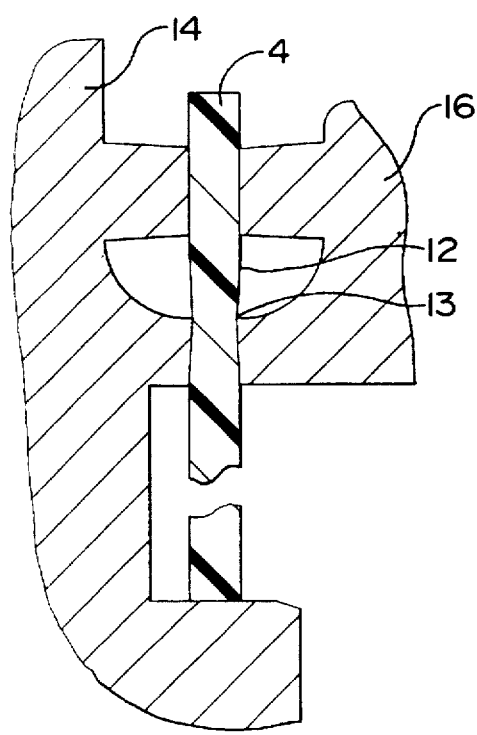
FIGS. 9 and 10 illustrate two stages in the manufacture of a seal as shown in FIGS. 7 and 8, FIG. 9 illustrating a mold, with an inserted PTFE sealing member, in open position and FIG. 10 illustrating the mold in closed position.
Figure 9:
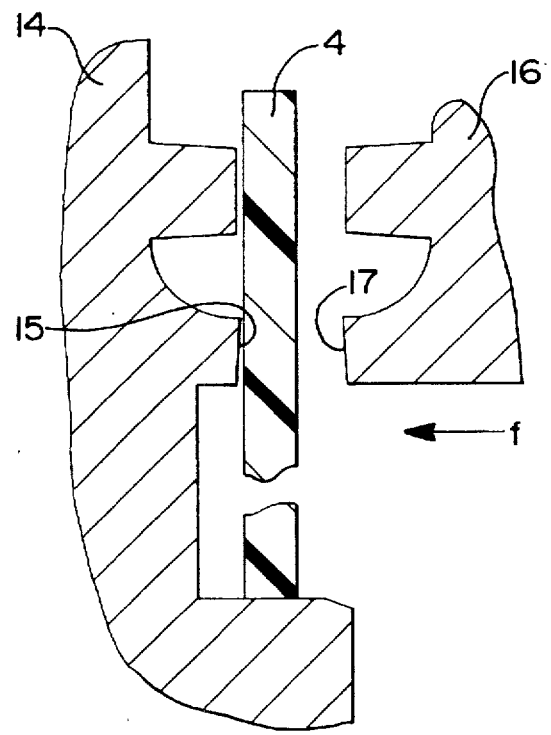
Figure 3:
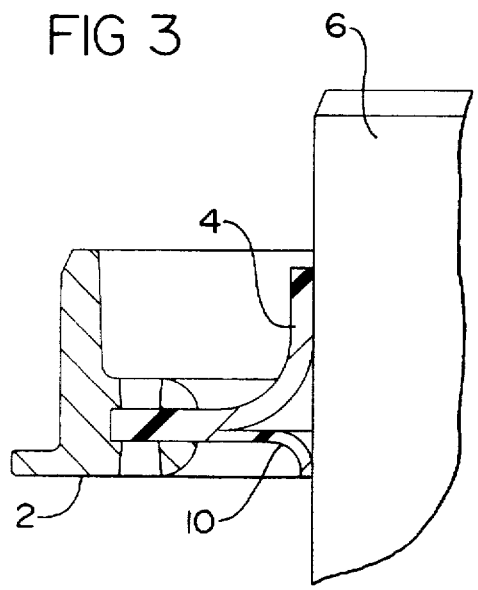
FIGS. 2 to 5 show different embodiments of seals for shafts, each in axial semisection.
Figure 4:
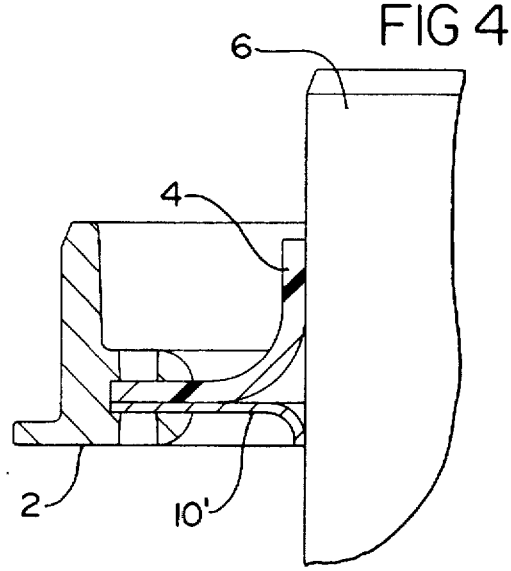
Figure 2:
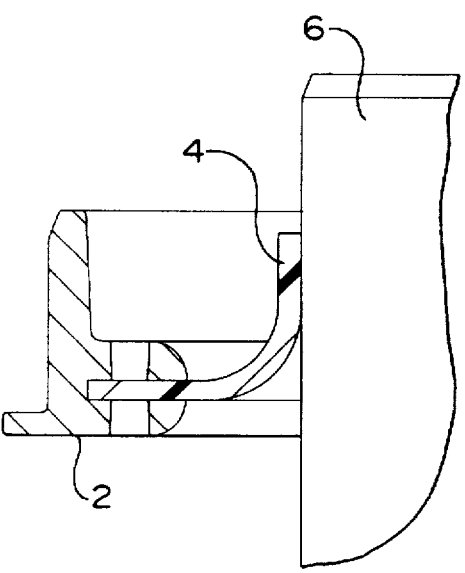
Figure 5:
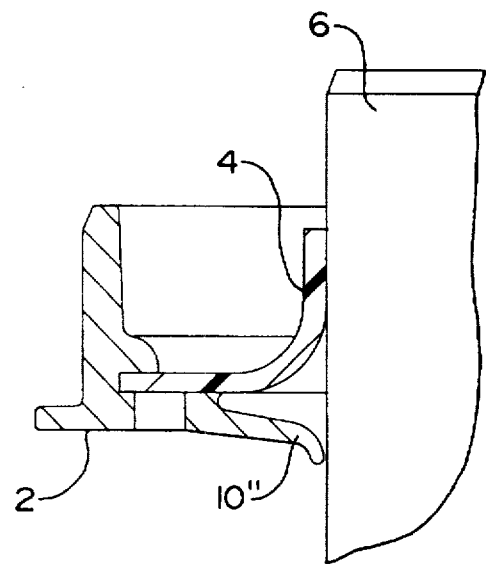
Figure 6:
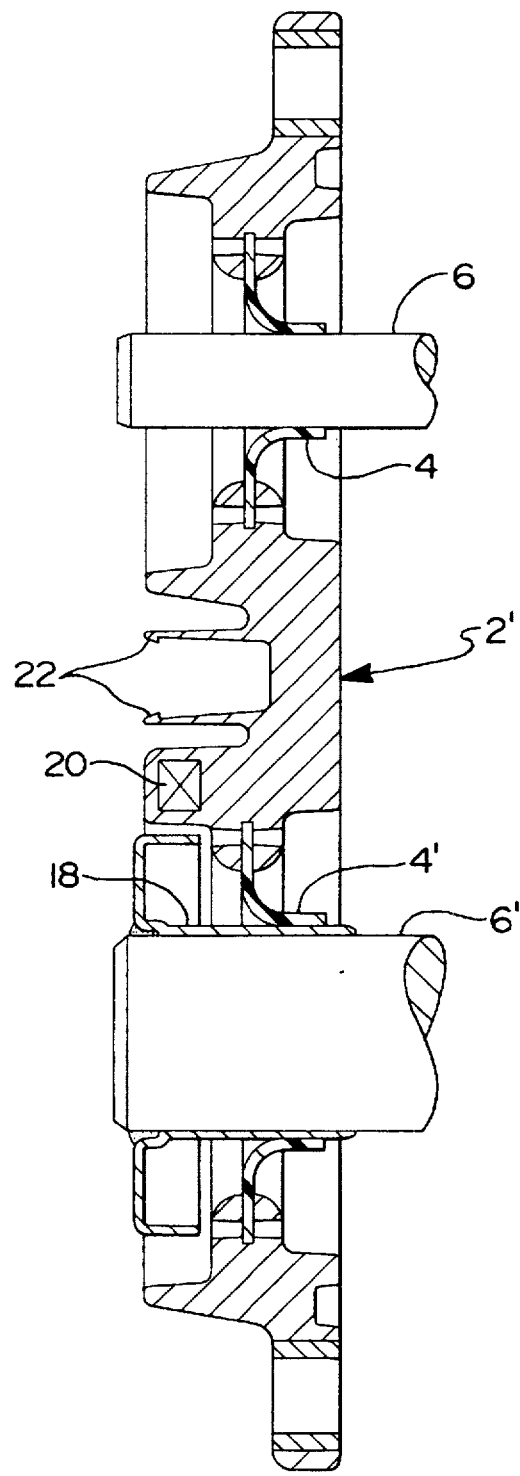
FIG. 6 is an axial sectional elevation of an integrated seal for two parallel shafts according to the invention.
Figure 7:
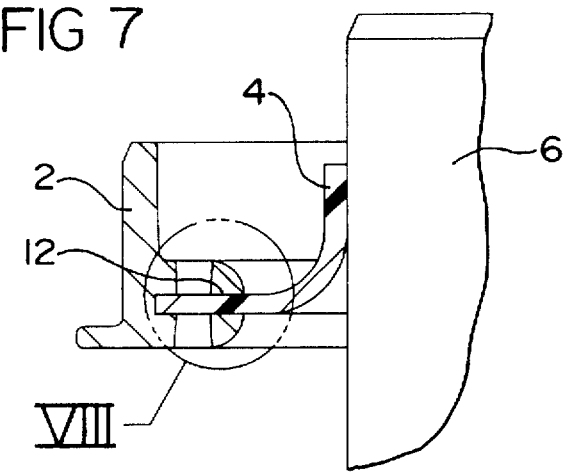
FIG. 7 shows a seal according to the invention as illustrated in FIG. 2, but with a form-lock connection between the sealing member and the carrier body.
Figure 8:
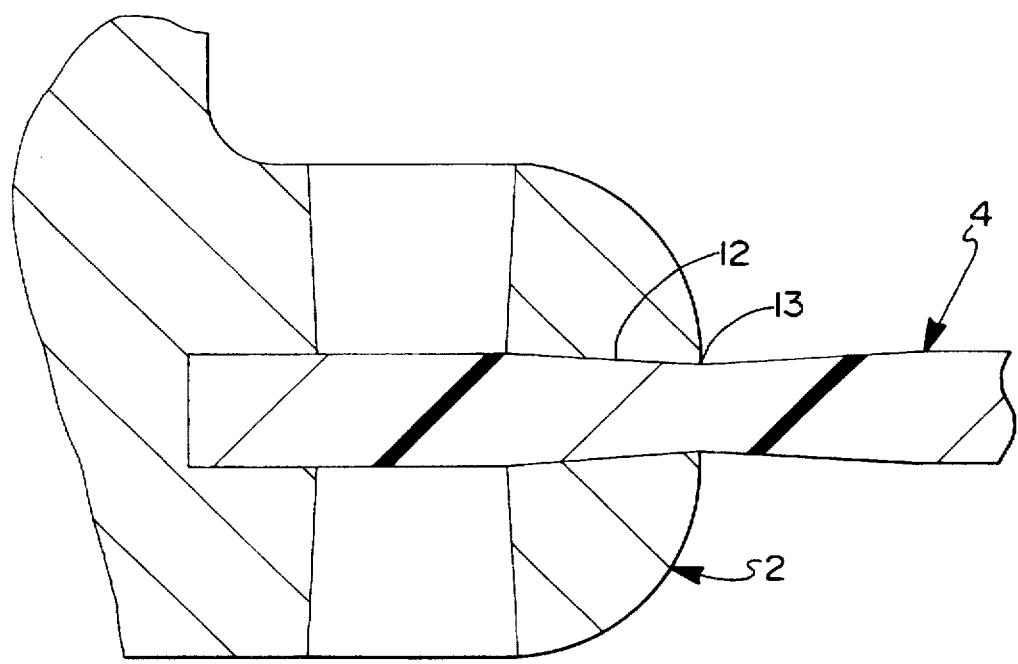
FIG. 8 shows the cutout marked VIII in FIG. 7 on an enlarged scale.

For the sake of simplicity, like reference numerals are used throughout the drawings to mark parts which are identical or have the same functions, more specifically 2 and 2' designate a carrier body made of plastics; 4 and 4' designate a sealing member made of polytetrafluoroethylene (PTFE) compound material (PTFE plastic material modified by such fillers as are customary for sealings); 5 designates slightly conical bores resulting from pins for axially fixing the sealing member 2 in an injection mold; 6 designates a movable structural component which is intended to be sealed—in FIG. 1 a piston rod supported for translatory movement, in FIGS. 2 to 5 and 7 rotary shafts 6, a second shaft to be sealed being marked 6' in FIG. 6; 8 designates a cylinder wall in FIG. 1; 10 designates a protective lip which is integrally formed with the sealing member in FIG. 3; 101 designates a contacting protective lip provided separately from the sealing member 4 in FIG. 4; 10" designates a contactless protective lip as part of the carrier body 2 in FIG. 5; 12 designates a tapered slightly V-shaped constriction or undercut in sealing member 4 according to FIGS. 7 and 8; 13 designates a stamping edge as the deepest place of the undercut 12 at the radially inner edge of the carrier body in FIGS. 7 and 8; 14 and 16 designate two mold parts of a mold which are movable with respect to each other to stamp the undercut 12 upon closing of the mold 14, 16 according to FIG. 10 in the direction of arrow f according to FIG. 9; 15 and 17 in FIG. 9 designate facets of the mold parts 14 and 16, respectively; 18 designates a race mounted on the second shaft 6' in FIG. 6 and sealed by a second sealing member 4' which is seated in the same carrier body 2'; 20 designates a sensor or actor inserted in the carrier body 2' shown in FIG. 6; 22 designates snap connectors formed integrally at the carrier body 2' for connection of another component part, not illustrated in the drawing.

A substance-lock connection or bond between the plastic material of the sealing member 4, 4' and the plastic material of the carrier body 2, 2' is obtained by adding to the PTFE compound material of the sealing member a small quantity of the plastic material of which the carrier body is made, or of another substance, especially plastics, which is compatible with the plastic material of the carrier body.

Experiments have shown that at least 0.3% by weight and at most 40% by weight of the plastic material of the carrier body should be added to the PTFE material of the sealing member. The best results both in terms of good sealing properties of the sealing member and a good connection in substance lock (bond) were achieved with an addition of from 5 to 10% by weight. Plastics which proved to be especially well suited to be admixed to the PTFE compound material of the sealing member include polyphenylene-sulfide (PPS), polyamide (PA), and polyethylene (PE). The associated carrier bodies in each case consisted of the respective PPS, PA, or PE. The plastics used for the carrier body and the material mixed with the sealing member need not be identical; they merely must be compatible in the sense of making the substance-lock connection. For example, PE may be added to the PTFE compound material of the sealing member, while the carrier body is injection molded of PA.

Instead of admixing the plastic materials mentioned, the surface of the PTFE sealing member 4 may be modified by incorporation of the plastic material of which the carrier is made or of a plastic material compatible with the same. To accomplish that, the plastic material in question is applied by vapor deposition or plasma polymerization on the surface of the sealing member 4. Preferably, the surface is modified only in that partial area which will be connected directly in substance lock to the carrier body 2. To that end, the sealing member is simply masked during the vapor deposition or plasma polymerization, with the exception of the partial area in question.

Simple degreasing is sufficient, and the environmentally objectionable, expensive etching of the PTFE sealing member may be dispensed with.

In any case, the sealing member having been modified by the admixture or surface treatment described, is placed in the injection mold to produce the seal. Upon closing of the mold, the plastic material which will form the carrier body is injected into the mold. During this time the sealing member fuses to the plastics of the carrier body as it cools, thereby providing a durable connection in substance lock.

Simultaneously with the closing of the injection mold, the undercut 12 shown in FIG. 8 may be produced in the manner illustrated in FIGS. 9 and 10 by pressing together the mold parts 14, 16 which are formed with facets 15 and 17, respectively. The deepest place of the undercut 12 results at the edge of the carrier body 2 facing the shaft 6 and takes the form of a step or stamping edge 13 (FIG. 8). During the subsequent injection molding, the undercut thus formed is filled with the carrier body plastics so that a connection in mechanical or form lock is established in addition to the substance-lock connection between the carrier body 2 and the PTFE sealing member. In testing, an undercut as embodied in FIG. 8 provided the best results as regards static tightness which is difficult to achieve.

If a connection in form lock is made, the substance-lock connection may be dispensed with, and vice versa.

What is claimed is:

1. A method of injection molding and mechanically locking a carrier body made of thermoplastic material to a sealing member made of polytetrafluoroethylene said method comprising the steps of: placing the sealing member in an injection mold; exerting a localized pressing force on opposite sides of the sealing member with the injection mold so as to form with the injection mold a permanent constriction between the opposite sides of the sealing member; injection molding the thermoplastic material into the injection mold and around the sealing member and into the constriction so as to form with the thermoplastic material a mechanical lock between the carrier body and the sealing member at the constriction; adding a plastic material to the sealing member and bonding the plastic material to the carrier body in the injection mold, wherein the plastic material is added to and mixed within the sealing member in an amount by weight of between 0.3% and 40%; and wherein said step of adding the plastic material to the sealing member includes vapor deposition onto a surface portion of the sealing member.

2. The method of claim 1, wherein the carrier body comprises an edge portion and wherein the constriction comprises a deepest constricted portion and wherein said method further comprises forming the lock between the edge portion and the sealing member at the deepest constricted portion.

3. The method of claim 2, wherein the plastic material is added in an amount by weight of between 5% and 10%.

4. A method of injection molding and mechanically locking a carrier body made of thermoplastic material to a sealing member made of polytetrafluoroethylene, said method comprising the steps of: placing the sealing member in an injection mold; exerting a localized pressing force on opposite sides of the sealing member with the injection mold so as to form with the injection mold a permanent constriction between the opposite sides of the sealing member injection molding the thermoplastic material into the injection mold and around the sealing member and into the constriction so as to form with the thermoplastic material a mechanical lock between the carrier body and the sealing member at the constriction; adding a plastic material to the sealing member and bonding the plastic material to the carrier body in the injection mold wherein the plastic material is added to and mixed within the sealing member in an amount by weight of between 0.3% and 40%; and wherein said step of adding the plastic material to the sealing member includes plasma polymerization onto a surface portion of the sealing member.

5. The method of claim 4, wherein the carrier body comprises an edge portion and wherein the constriction comprises a deepest constricted portion and wherein said method further comprises forming the lock between the edge portion and the sealing member at the deepest constricted portion.

6. The method of claim 5, wherein the plastic material is added in an amount by weight of between 5% and 10%.

* * * * *